Sept. 20, 1949.  M. J. CULP  2,482,658
EDUCATIONAL APPARATUS
Filed May 27, 1946
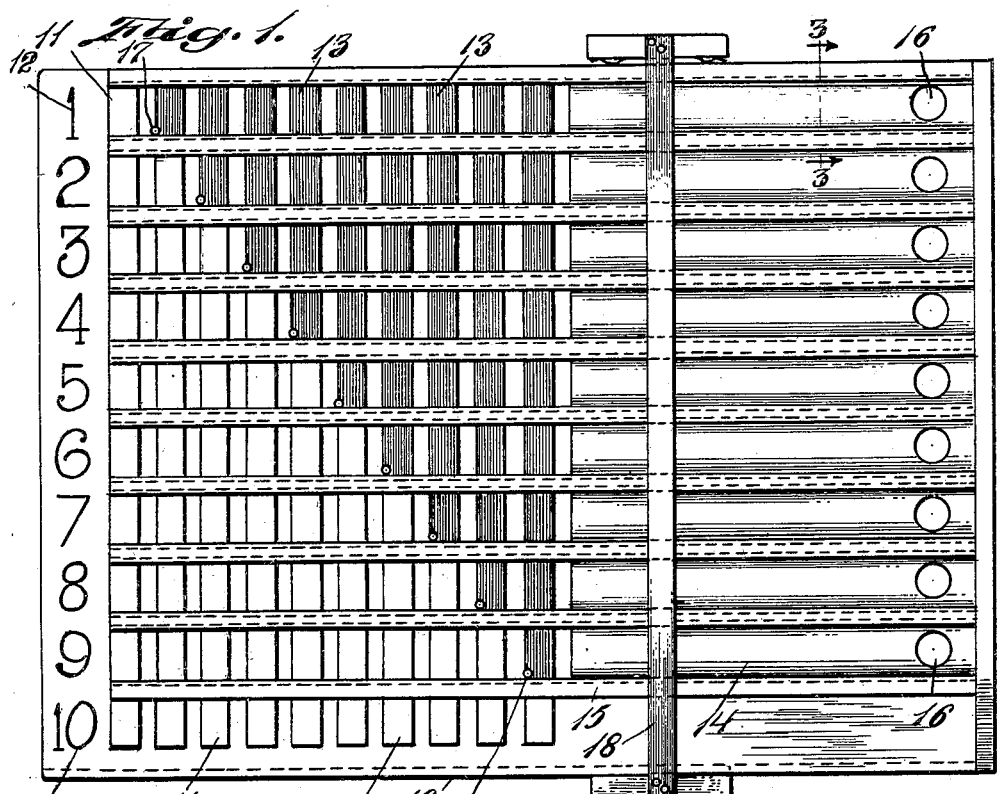
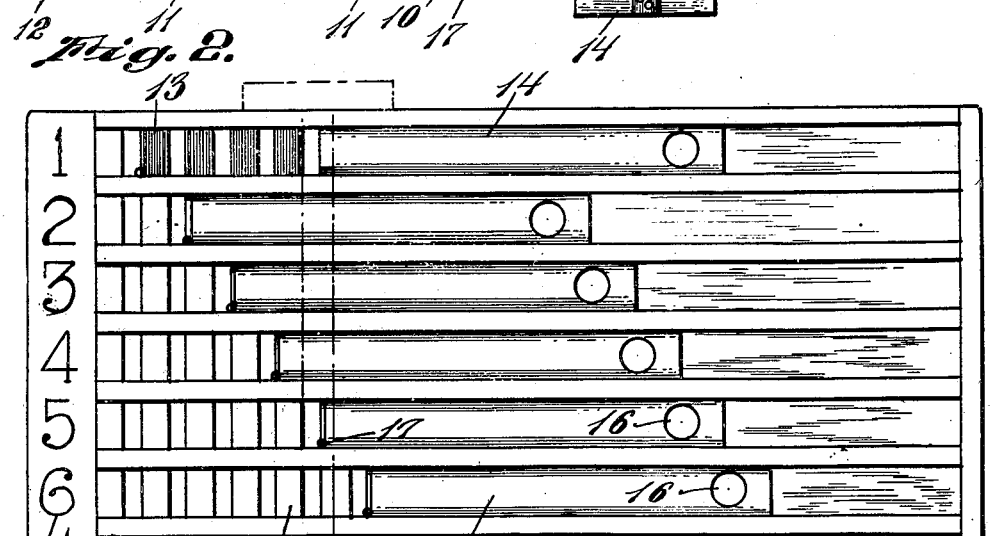
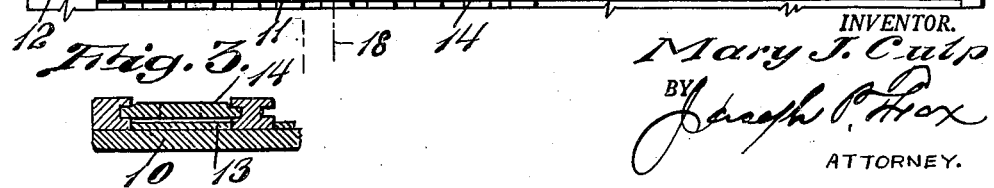
INVENTOR.
Mary J. Culp
BY
ATTORNEY.

Patented Sept. 20, 1949

2,482,658

UNITED STATES PATENT OFFICE 2,482,658

EDUCATIONAL APPARATUS

Mary J. Culp, Cranston, R. I.

Application May 27, 1946, Serial No. 672,437

4 Claims. (Cl. 35—31)

This invention relates to an educational apparatus, particularly an apparatus and method for teaching children the basic numbers and simple principles of arithmetic.

It is desirable in apparatus of this character that the same be of a simple nature so as not to confuse the young student. It is also desirable that the development of the process in simple arithmetic be illustrated so that the young student may more readily grasp the fundamental involved.

An object of the invention is the provision of an educational apparatus having the above desirable features.

Another object of the invention is the provision of an educational apparatus wherein unit things will be arranged so as to provide for comparing group combination unit things with known similar group unit things.

Another object of the invention is the provision of an educational apparatus for use in teaching children basic numbers and their relation to unit things.

Another object of the invention is the provision of an educational apparatus which can be manufactured at a comparatively low cost of production and which will be durable and satisfactory in use.

With these and other objects in view the invention comprises certain novel features of construction as will be hereinafter more fully described, claimed and illustrated in the accompanying drawings, in which Fig. 1 is a top plan view of an educational apparatus embodying my invention;

Fig. 2 is a fragmentary view of the apparatus shown in Fig. 1 but showing certain parts thereof in different relation to each other, and Fig. 3 is a sectional view taken substantially along line 3—3 of Fig. 1.

In carrying out the invention as applied to the teaching of basic numbers and simple arithmetic I provide a base 10 in which there is arranged horizontal rows of objects 11 for presenting quantities from one to ten in a consecutive order. Each row is preceded by a numerical symbol 12 having the same quantitative meaning as the number of objects in the row. Thus in the first horizontal row the single object 11 will be preceded by the numerical symbol one. The second row of objects 11 will be preceded by the numerical symbol two and the other rows of objects will be arranged in a similar manner. The objects 11 may take any of various forms, such as birds, animals, fish and inanimate things. The objects 11 herein shown are preferably thin blocks glued or otherwise secured to the base. However, the objects may be painted or otherwise represented on the base.

To each row of objects there is added other objects 13 in a number sufficient to provide ten objects in each horizontal row with each object in a row in line with the objects in the other rows. The objects 13 are similar to the objects 11 but are of a different color. The objects 11 may be red while the objects 13 may be black. Provision is made for covering the objects 11 and 13 and comprises slides 14 slidable in guides 15 positioned between and adjacent the horizontal rows of objects. Each slide is provided with an opening 16 for receiving the tip of a finger for convenience in moving the slide.

In the use of the apparatus for teaching addition it is desirable that the slides be prevented from accidentally covering any of the objects 11 and to this end pins 17 are detachably secured in each horizontal row adjacent the first object 13 in the row. The apparatus may be also provided with a vertical guide 18 slidably mounted on the edges of the base 10 as an aid in distinguishing particular vertical rows of objects.

In the use of the apparatus for teaching basic numbers and simple addition, the slides 14 are moved so as to cover all objects 13. The apparatus so arranged will now present rows of objects 11 of one color having the same quantitative meaning as the numerical symbol preceding the row. With the picture thus presented, the young student may be able to visualize side by side the numerical symbol and its quantitative meaning in unit things represented by the objects 11. When the young student has memorized the numbers one to ten and recognizes the quantitative meaning thereof in unit things, simple addition may be next taught by means of the apparatus. For example, four is required to be added to one. The slide in the row designated by the numerical symbol one is moved to expose four of the objects 13, see Fig. 2. The answer is to be found in the horizontal row in which the last object 11 is in vertical line with the last object 13 which was exposed in row designated by numeral one.

In the use of the apparatus for teaching simple subtraction within the capacity of the apparatus, the pins 17 are removed from the base 10 and only the objects 11 are exposed. A simple problem is given. For example, it is required to subtract two from four. The slide in the fourth row is moved to cover two objects 11. The young student then glances upwards and compares the resulting diminished group of objects with a similar known group for the answer.

It may now be apparent that I have disclosed an apparatus whereby a presentation of numerical symbols and their quantitative meaning in unit things are arranged in a manner whereby the young student may readily learn the fundamentals of simple arithmetic by actually visualizing the relation of unit things to numerical symbols; the growing of a group of unit things in the process of addition; the diminishing of a group of unit things in the process of subtraction; and by being able to compare groups of unit things resulting from addition and subtraction with known similar groups of unit things.

I claim:

1. An educational apparatus comprising a base, a plurality of rows of similar stationary objects on said base for presenting different quantities, and with the rows arranged to present the quantities in a consecutive order, each of said rows being designated by a numerical symbol having the same quantitative meaning as the number of objects in a row, second objects in said rows and of a number when combined with the first said objects in each row to provide each row with an equal number of objects and with the objects in one row positioned in line with the objects in the other rows, means in each row movable for covering all of said second objects in the row and movable for exposing any number of said second objects and a removable stop for each row positioned to be engaged by said means for limiting said means to cover only said second objects in each row.

2. An educational apparatus as set forth in claim 1 wherein said means comprises a slide and said stop is a removable pin.

3. An educational apparatus as set forth in claim 1 wherein the second said objects are of a color different from the first said objects.

4. An educational apparatus comprising a base, a plurality of rows of stationary objects on said base for presenting different quantities from one to ten in a consecutive order, a grooved guide between each row, each of said rows being designated by a numerical symbol having the same meaning as the number of objects in the row, second objects in said rows of a color different from the first said objects and of a number when combined with the first said objects to provide each row with ten objects, a plurality of slides mounted in said guides for movement over said second objects in each row to cover the same and movable to expose any number of said second objects in the row and a removable stop pin in each row for limiting said slides to cover only said second objects in each row.

MARY J. CULP.

REFERENCES CITED

The following references are of record in the file of this patent:

UNITED STATES PATENTS

| Number | Name | Date |
|---|---|---|
| 422,612 | Neuhaus | Mar. 4, 1890 |
| 1,941,733 | Badanes | Jan. 2, 1934 |
| 2,206,294 | Stern | July 2, 1940 |

FOREIGN PATENTS

| Number | Country | Date |
|---|---|---|
| 3,132 | Great Britain | Feb. 9, 1910 |
| 6,410 | Germany | July 22, 1879 |